(12) United States Patent
Tsukada et al.

(10) Patent No.: US 8,259,937 B2
(45) Date of Patent: Sep. 4, 2012

(54) CREATING METHOD, INFORMATION INTRODUCING SYSTEM, CREATING APPARATUS, COMPUTER PROGRAM, AND RECORDING MEDIUM

(75) Inventors: Hideto Tsukada, Tokyo (JP); Katsuyuki Sanekata, Tokyo (JP)

(73) Assignee: Creative Link Corporation, Tokyo (JP)

( * ) Notice: Subject to any disclaimer, the term of this patent is extended or adjusted under 35 U.S.C. 154(b) by 1157 days.

(21) Appl. No.: 12/089,114

(22) PCT Filed: Apr. 17, 2006

(86) PCT No.: PCT/JP2006/308037
§ 371 (c)(1),
(2), (4) Date: Apr. 3, 2008

(87) PCT Pub. No.: WO2007/043204
PCT Pub. Date: Apr. 19, 2007

(65) Prior Publication Data
US 2010/0154034 A1 Jun. 17, 2010

(30) Foreign Application Priority Data
Oct. 7, 2005 (JP) .................................. 2005-295746

(51) Int. Cl.
*G06F 21/00* (2006.01)
(52) U.S. Cl. ....................................................... 380/201
(58) Field of Classification Search ................... 380/201
See application file for complete search history.

(56) References Cited

U.S. PATENT DOCUMENTS

| 6,728,773 | B1 | 4/2004 | Corless |
| 2002/0133705 | A1 | 9/2002 | Tagashira et al. |
| 2005/0050446 | A1* | 3/2005 | Miura et al. ................... 715/500 |
| 2005/0125285 | A1* | 6/2005 | McQueeney et al. ........... 705/14 |
| 2008/0168053 | A1* | 7/2008 | Garg et al. ......................... 707/5 |
| 2009/0169021 | A1* | 7/2009 | Ushiyama ..................... 380/279 |

FOREIGN PATENT DOCUMENTS

| JP | 2001-109761 | 4/2001 |
| JP | 2001-290780 | 10/2001 |
| JP | 2005-250826 | 9/2005 |
| WO | 03102727 | 12/2003 |

OTHER PUBLICATIONS

International Search Report for PCT/JP2006/308037 dated Jun. 6, 2006.
European Search Report dated Nov. 19, 2008 corresponding to U.S. Appl. No. 12/089,114, filed Apr. 3, 2008.

* cited by examiner

*Primary Examiner* — Michael S McNally
(74) *Attorney, Agent, or Firm* — Turocy & Watson, LLP

(57) ABSTRACT

There are provided a method and others capable of appropriately protecting literary works without requiring any operation by a web site administrator or a user. A web server transmits a content, copyright information on the content, and execution information for introducing the content to a creation device. The creation device receives the transmitted content, copyright information, and execution information. When the content is introduced in association with the transmitted execution information, the creation device extracts the copyright information on the transmitted content and transmits the address of the content and the extracted copyright information to a creation program for creating a web page.

18 Claims, 15 Drawing Sheets

Fig. 5

CREATING METHOD, INFORMATION INTRODUCING SYSTEM, CREATING APPARATUS, COMPUTER PROGRAM, AND RECORDING MEDIUM

TECHNICAL FIELD

The present invention relates to a creation method of creating a webpage for introducing content using a creation device connected therewith through a communication network to a web server in which the content is stored, and to an information introducing system and the creation device used for the method, and to a computer program and a recording medium for realizing a function of the creation device, and more particularly to a technology to appropriately protect copyright information on the content in the webpage to be introduced.

BACKGROUND ART

In recent years, what is called a blog (or weblog) has spread, in which a hyperlink to news articles or images that exist in a website on the Internet, or a hyperlink to a specific website is set up, and articles added with one's own criticisms to the news article to introduce it are arranged in a chronological order. Upon creation of a blog, the blog may be easily created on a browser by using software, such as BLOGGER or MOVABLETYPE (refer to Japanese Unexamined Patent Application Publication No. 2005-235118).

However, in many cases, contents published on the website, such as images, movies, or texts copyright has been granted. There is a problem that the contents are displayed in a user's blog without the user being conscious of the copyright in many cases. In the meantime, a procedure for the user to individually obtain an authorization of the copyright from a website administrator is complicated.

Further, images, movies, or the like on the website where news are published are set up with a publishing period by a contract. Thus, there also is a problem that the time period will lapse, even if the user introduced the image in his/her blog.

Further, depending on the content to be introduced, it may not be appropriate for regulations of each country from moral or legal perspective. Thus, it is necessary to impose certain access restrictions, also in the blog that can freely introduce contents.

SUMMARY

The present invention addresses the conditions. A purpose of the present invention is to provide a creation method an information introducing system, the creation device, a computer program, and recording medium, that can appropriately protect a copyrighted work without bothering a website administrator and a user by appropriately processing the copyright information on the content to be introduced.

Another purpose of the present invention is to provide a creation method and the like that can appropriately handle the content, a publishing period of which lapsed, by processing using time-period information during which the content is published.

Still another purpose of the present invention is to provide a creation method and the like that does not violate the morals or laws of each country by performing an access control.

A creation method according to the present invention is a creation method of creating a webpage for introducing content using a creation device connected to a web server through a communication network, the web server storing the content. The creation method is characterized by including a transmitting step for causing the web server to transmit content, copyright information on the content, execute information for executing an introduction of the content to the creation device, a step for causing a control module of the creation device to extract the transmitted copyright information on the content when the introduction of the content is executed in association with the transmitted execute information, and a sending step for causing the control module of the creation device to send an address and the extracted copyright information of the content to a creation program for creating a webpage.

The creation method according to the present invention may be characterized by further including a step for causing an input module of the creation device to receive a comment related to the content, and an output step for causing the control module of the creation device to output the address and the copyright information of the content sent corresponding to the received comment in the sending step, to an open server computer connected through the communication network.

An information introducing system according to the present invention is an information introducing system including a web server in which content is stored, and a creation device connected to the web server through a communication network and for creating a webpage for introducing the content. The information introducing system is characterized in that the web server includes a transmitting means for transmitting content, copyright information on the content, and execute information for executing an introduction of the content to the creation device, and the creation device includes a control module, a means for causing the control module to extract the transmitted copyright information on the content when the introduction of the content is executed in association with the transmitted execute information, and a sending means for causing the control module to send the address and the extracted copyright information of the content to a creation program for creating a webpage.

The information introducing system according to the present invention may be characterized in that the creation device further includes a means for receiving a comment related to the content from an input module, and an output means for causing the control module to output the address and the copyright information of the content that are sent by the sending means, corresponding to the received comment to an open server computer connected through the communication network.

The information introducing system according to the present invention may be characterized in that the transmitting means is configured so that it further transmits time-period information during which publicizing of the content is permitted, and the creation device further includes a means for causing the control module to display information indicating that an introduction period of the content ends, based on the transmitted time-period information.

The information introducing system according to the present invention may be characterized in that the creation device further includes a means for storing a refusal address of an accessing end, introduction of which is to be refused, and the output means is configured so that it outputs the address, the copyright information on the content, and the refusal address corresponding to the content, corresponding to the received comment, to the open server computer.

An information introducing system according to the present invention is an information introducing system including a web server in which content is stored, a creation device for creating a webpage for introducing the content, and a server computer for publicizing the content. The information introducing system is characterized in that the web server includes a transmitting means for transmitting content, execute information for executing the introduction of the content, and an address of the open server computer to the creation device. The creation device includes a control module, and a means for causing the control module to transmit an address of the content to the open server computer with reference to the address of the open server computer, when the introduction of the content is executed in association with the transmitted execute information. The open server computer includes an open control module, a means for accessing the web server with reference to the transmitted address of the content, and causing the open control module to acquire the copyright information on the content, and a memory means for storing the acquired copyright information and the address of the content so as to correspond one to the other.

The information introducing system according to the present invention may be characterized in that the creation device includes a means for receiving a comment related to the content from an input module, and an output means for causing the control module to output the received comment to the open server computer, and the memory means is configured so that it stores the comment transmitted from the creation device so as to correspond it to the address and the copyright information of the content that are stored.

A creation device according to the present invention is a creation device for causing a control module to create a webpage for introducing content. The creation device is characterized by including a receiving means for receiving content, copyright information of the content, execute information for executing an introduction of the content, from outside, a means for causing the control module to extract the transmitted copyright information on the content when the control module determines that the introduction of the content is executed in association with the received execute information, and a sending means for causing the control module to send the address and the extracted copyright information of the content to a creation program for creating the webpage.

The creation device according to the present invention may be characterized by further including a means for receiving a comment related to the content from an input module, and an output means for causing the control module to output the address and the copyright information of the content to outside that are sent by the sending means corresponding to the received comment.

The creation device according to the present invention may be characterized in that the receiving means is configured so that it further receives time-period information during which publicizing of the content is permitted, and the creation device further includes a means for causing the control module to display information indicating that an introduction period of the content ends, based on the transmitted time-period information.

The creation system according to the present invention may be characterized by further including a means for storing a refusal address of an accessing end, introduction of which is to be refused, in a memory module. The output means may be configured so that it outputs the address of the content corresponding to the received comment, and the copyright information, and the refusal address corresponding to the content.

A creation device according to the present invention is a creation device for causing a control module to create a webpage for introducing content. The creation device is characterized by including a means for receiving a selection of the content to be introduced from an input module, a means for causing the control module to extract an address of the received content and copyright information, a sending means for causing the control module to send the address and the extracted copyright information of the content to a creation program for creating the webpage.

The creation device according to the present invention may be characterized by further including a means for receiving a comment related to the content from the input module, an output means for causing the control module to output the address and the copyright information of the content that are sent by the sending means, corresponding to the received comment.

A computer program according to the present invention is characterized by being a computer program for causing a control module of a computer to execute a receiving step for receiving content, copyright information on the content, execute information for executing an introduction of the content, from outside, a step for causing the control module to extract the transmitted copyright information on the content when the control module determines that the introduction of the content is executed in association with the received execute information, and a transmitting step for causing the control module to transmit the address and the extracted copyright information of the content to a creation program for creating the webpage. A recording medium according to the present invention is characterized by being a recording medium readable by a computer on which a computer program for causing the computer including a control module to create a webpage for introducing content is recorded. The computer program recorded on the recording medium causes the control module of the computer to execute a receiving step for receiving content, copyright information on the content, execute information for executing an introduction of the content, from outside, a step for causing the control module to extract the transmitted copyright information on the content when the control module determines that the introduction of the content is executed in association with the received execute information, and a sending step for causing the control module to send the address and the extracted copyright information of the content to a creation program for creating the webpage.

A computer program according to the present invention is characterized by being a computer program for causing a computer including a control module to create a webpage for introducing content. The computer program causes the computer to execute a step for receiving a selection of the content to be introduced from an input module, a step for causing the control module to extract an address and copyright information of the received content, and a transmitting step for causing the control module to transmit the address and the extracted copyright information of the content to a creation program for creating the webpage. A recording medium according to the present invention is characterized by being a recording medium readable by a computer on which a computer program for causing the computer including a control module to create a webpage for introducing content is recorded. The computer program recorded on the recording medium causes the computer to execute a step for receiving a selection of the content to be introduced from an input module, a step for causing the control module to extract an address and copyright information of the received content, and a sending step for causing the control module to send the address and the extracted copyright information of the content to a creation program for creating the webpage.

In the present invention, the information introducing system includes the web server in which content is stored, and the creation device connected with the web server through the communication network for creating a webpage for introducing the content. The web server transmits content, copyright information of the content, and execute information for executing an introduction of the content to the creation device. The creation device receives the content, the copyright information, and the execute information that are transmitted. When the control module determines that the introduction of the content is executed in association with the transmitted execute information, the creation device causes the control module to extract the transmitted copyright information of the content. In addition, the control module sends the address and the extracted copyright information of the content to the creation program for creating the webpage.

In addition, the creation device receives the comment related to the content from the input module. The creation device causes the control module to output the address and the copyright information of the content that are sent corresponding to the received comment to the open server computer connected therewith through the communication network. Thus, by performing the introduction of the content which a user wants to introduce, because the copyright information on the content is sent to the creation program and outputted to the open server computer, it is possible to appropriately protect a copyrighted work with easy processes, without bothering the website administrator who administrates the content, and the user.

In the present invention, the web server transmits the time-period information during which the publicizing of the content is permitted to the creation device. The control module of the creation device that received the time-period information displays the information indicating that the introduction period of the content ends, based on the transmitted time-period information. There fore, even when the user introduces a website where the publishing period of an image is set for the website, such as of news, the user can easily recognize an end-time of the publishing period.

In the present invention, the control module of the creation device stores the refusal address of the accessing end, introduction of which is to be refused, in the memory module. The creation device outputs the address of the content, the copyright information, and the refusal address corresponding to the content, corresponding to the received comment for the content, to the open server computer. In addition, the open server computer restricts viewing of the content by referring to the refusal address information and the address of the computer to which access is attempted. Therefore, the user is possible to impose the view restriction according to the morality or law of each country. Further, the website administrator who provides the content also is possible to reliably permit the introduction of the content by the user reliably.

In the present invention, the creation device receives the selection of the content to be introduced, from the input module. In addition, the control module extracts the address and the copyright information of the content that are received. The control module sends the address and the extracted copyright information of the content to the creation program for creating the webpage. The creation device receives the comment related to the content from the input module. The creation device outputs the address and the copyright information of the content that are sent corresponding to the received comment. Therefore, the user is possible to easily introduce the content expanding through the websites, while taking copyright into consideration.

In the present invention, the information introducing system includes the web server in which the content is stored, the creation device that creates the webpage to introduce the content, and the open server computer of the content, connected with each other through the communication network. First, the web server transmits the content, the execute information for executing the introduction of the content, and the address of the open server computer in response to a request from the control module of the creation device. The creation device accesses the open server computer with reference to the transmitted address of the open server computer, when the introduction of the content is executed in association with the transmitted execute information. Further, the address of the content is transmitted to the open server computer by the control module. The open control module of the open server computer receives the address of the transmitted content, and accesses the web server with reference to the address of the content. In addition, the open control module performs an acquisition request for the copyright information according to the address of the content to the web server. The web server transmits the copyright information corresponding to the content to the open server computer in response to the acquisition request. Thus, the open control module of the open server computer acquires the copyright information of the content. The open control module of the open server computer stores the acquired copyright information and the address of the content so as to correspond to each other.

Further, the creation device receives the comment related to the content from the input module. The creation device causes the control module to output the received comment to the open server computer. The open server computer stores the comment transmitted from the creation device so as to correspond it to the address and the copyright information of the content that has already been stored. Thus, because the copyright information is acquired when the execution of the introduction of the user's content, it is possible to adequately protect the content with a simple configuration.

In the present invention, the creation device extracts the transmitted copyright information of the content, when the introduction of the content is executed in association with the transmitted execute information. The creation device sends the address and the extracted copyright information of the content to the creation program for creating the webpage. Therefore, it is possible to appropriately protect a copyrighted work with easy processes, without bothering the website administrator who administrates content, and the user.

In the present invention, the creation device that received the time-period information displays the information indicating that the introduction period of the content ends, based on the transmitted time-period information. There fore, even when the user introduces the website where the publishing period of the image is set for the website, such as of news, the user can easily recognize the end-time of publishing period.

In the present invention, the creation device outputs the refusal address corresponding to the content to the open server computer. The open server computer restricts the viewing of the content by referring to this refusal address information and the address of the computer to which access is attempted. Therefore, the user is possible to impose view restriction according to the morality or law of each country. Further, the website administrator who provides the content also is possible to permit the introduction of the content by the user without anxiety by performing the view restriction.

Further, in the present invention, the control module extracts the address and the copyright information of the content that are received. The control module sends the address and the extracted copyright information of the content to the creation program for creating the webpage. The creation device receives the comment related to the content from the input module, and outputs the address and the copyright information of the content that are sent corresponding to the received comment. Therefore, it is possible for the user to introduce the content expanding through the websites with a simple configuration, while taking copyright into consideration.

Further, in the present invention, when the introduction of the content is executed, the open server computer according to the address transmitted with the execute information acquires the copyright information corresponding to the content from the web server. Therefore, information related to copyright can be displayed without the user who introduces the content being particularly conscious, and it is possible to appropriately protect the copyright of the content. As such, the present invention excels in the effects as above.

BRIEF DESCRIPTION OF THE DRAWINGS

FIG. 5 is an explanatory diagram showing an image of a web browser that is a creation program.

Figure 1:
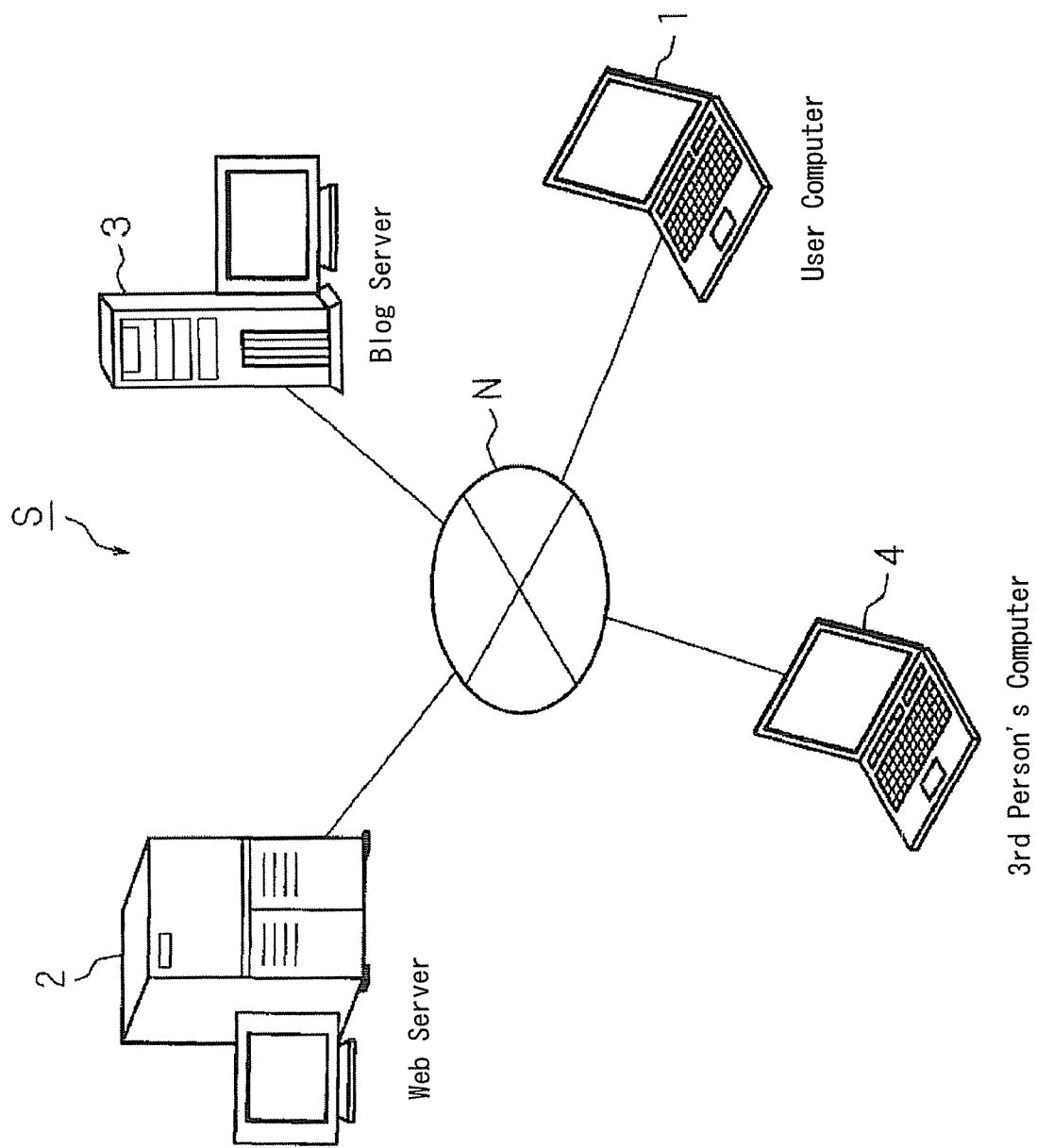
FIG. 1 is a schematic view showing a configuration of an information introducing system according to the present invention.

DESCRIPTION OF REFERENCE NUMERALS 1 user computer
1a recording medium
2 web server
3 blog server (open server computer)
4 3rd person's computer
11 CPU (control module)
11a recording medium
13 input module
14 display module
15 memory module
16 communication module
25 memory module
31 CPU (open control module)
35 memory module
41 "introduce" button (execute information)
53 address input box
54 content box
151 control program
152 web browser (creation program)
153 time-period information file
251 webpage file
253 time-period information file
351 blog file
N network (Internet)
S information introducing system

DETAILED DESCRIPTION OF THE PREFERRED EMBODIMENT (Embodiment 1)

FIG. 1 is a schematic view showing a configuration of an information introducing system according to the present invention. In the information introducing system S, a creation device 1, a web server 2, an open server computer 3, and a third person's computer 4 are connected with each other through a communication network N, such as the Internet (hereinafter, referred to as "Internet N"). A known personal computer may be used as the creation device 1, and hereinafter, the creation device 1 will be explained as a user computer 1. Known server computers may be used as the web server 2 and the open server computer 3, and the open server computer 3 will be explained as the blog server 3. Further, as for the third person's computer 4, a personal computer may be used. In the following embodiment, although the content to be introduced is an image, and a mode in which a user introduces the image by a so-called "blog" using the user computer 1 will be explained, the content may be a movie, a text, etc., as long as the content is a copyrighted work.

The web server 2 stores the content, and publishes a webpage on which the content is placed, through the Internet N. Here, in this embodiment, although the web server 2 publishes the webpage related to a newspaper article, it should not be limited to this. The user accesses the web server 2 using the user computer 1 to view the webpage. When content, such as an image, that is desired to be published to a third person exists in the webpage, the user creates a blog to which a comment related to this is added. The created blog is uploaded (transmitted) to the blog server 3, and the third person's computer 4 can view this introduced content and the comment related to the content by accessing the blog server 3.

Figure 2:
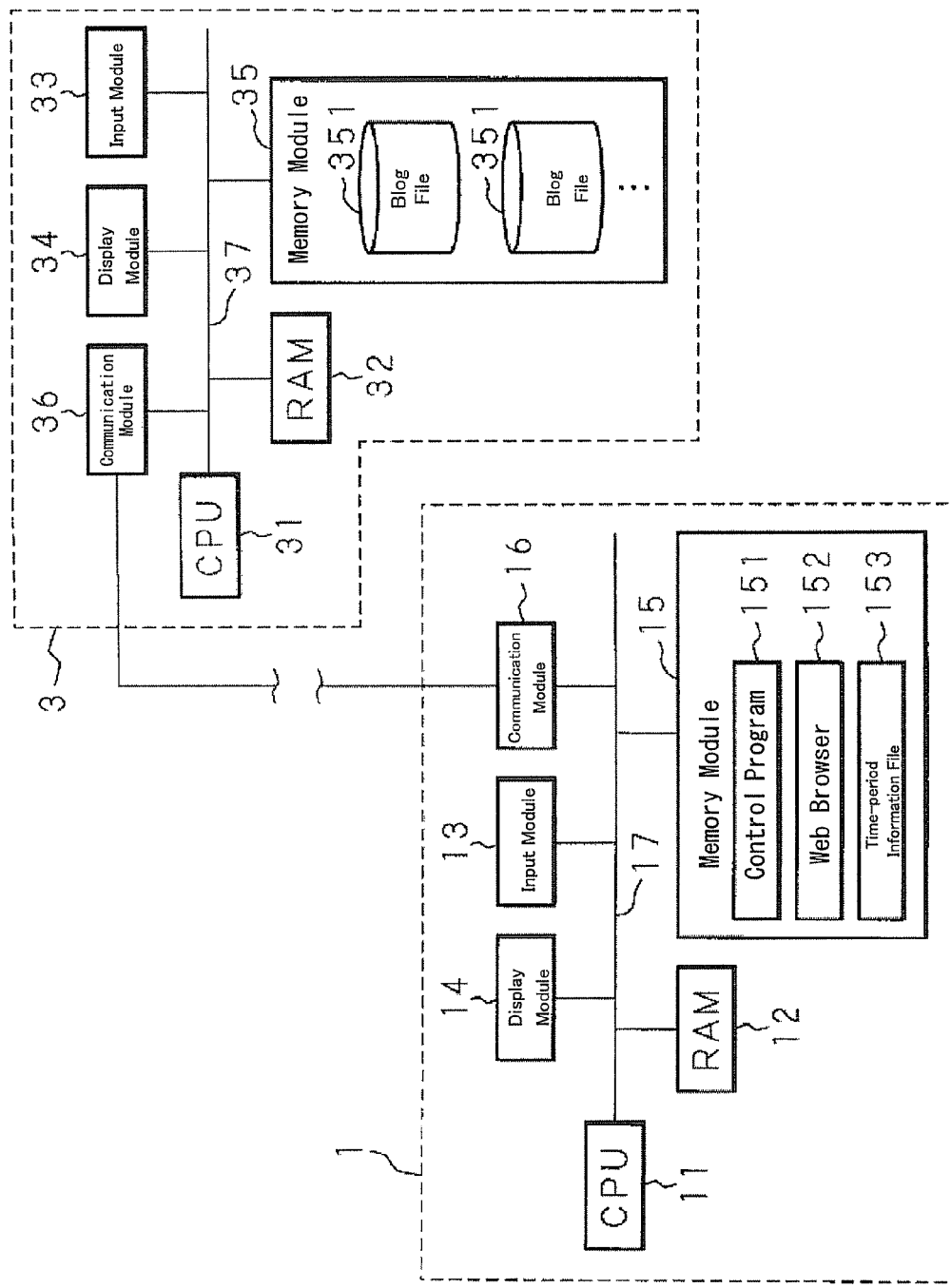
FIG. 2 is a block diagram showing a hardware configuration of a user computer and a blog server.

FIG. 2 is a block diagram showing a hardware configuration of the user computer 1 and the blog server 3. The user computer 1 is configured so as to include a CPU (Central Processing Unit) 11 that is a control module, and a RAM (Random Access Memory) 12, a memory module 15, an input module 13, a display module 14, and a communication module 16. CPU 11 is connected with each hardware component of the user computer 1 through a bus 17 to control them, and executes various software-based functions according to a control program 151 stored in the memory module 15, such as a hard disk drive. The control program 151 is described in a programming language, such as C language or JAVA®.

RAM 12 is constituted with a SRAM (Static Random Access Memory) or a flash memory to store temporary data generated at the time of execution of the software. For example, the input module 13 is constituted with a keyboard, a mouse, etc. to output information inputted by the user to CPU 11. The display module 14 is constituted with a LCD (Liquid Crystal Digital) display, etc. Here, the input module 13 and the display module 14 may be integrated as a touch panel.

The memory module 15 stores a web browser 152 as a creation program for creating a webpage for introducing content (i.e., a blog). Further, the memory module 15 stores a time-period information file 153 for permitting publicizing of the content. The time-period information file 153 stores a period during which the publicizing is permitted so as to correspond it to an address, such as an URL (Uniform Resource Locate), of the content to be introduced.

The blog server 3 is configured so as to include a CPU 31 that is an open control module, a RAM 32, a memory module 35, an input module 33, a display module 34, and a communication module 36. CPU 31 is connected with each hardware component of the blog server 3 through a bus 37 to control them, and performs various software-based functions. RAM 32 is constituted with a SRAM or a flash memory to store temporary data generated at the time of execution of the software. For example, the input module 33 is constituted with a keyboard, a mouse, etc. to output information inputted by the user to CPU 31. The display module 34 may be constituted with an LCD display, etc.

The memory module 35 stores blog files 351 uploaded by each user. An authorized user can access the blog file 351 to suitably change the content. The blog file 351 is open to the third person, and the third person can view the content by inputting the URL corresponding to the blog file 351 to the third person's computer 4.

Figure 3:
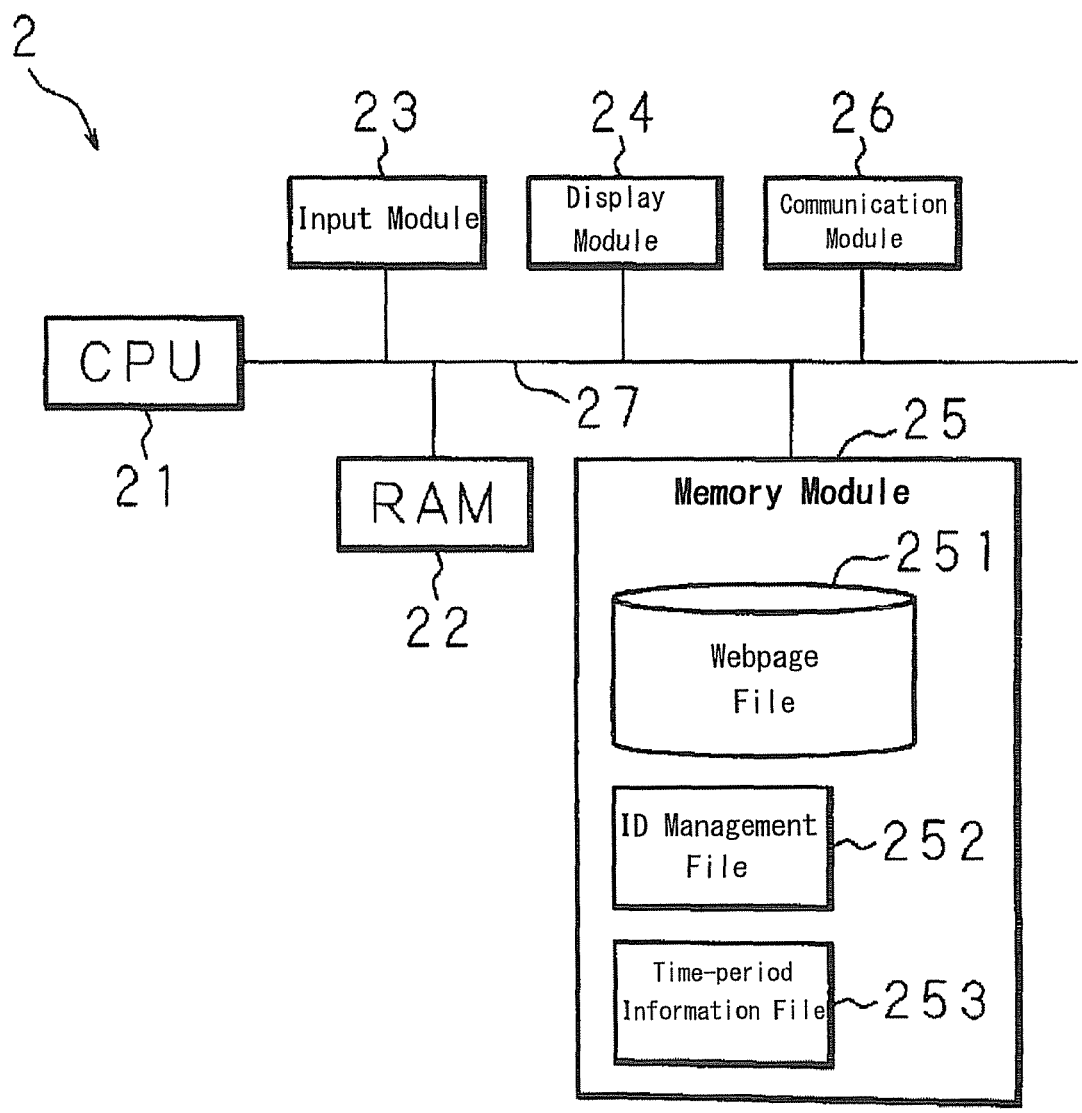
FIG. 3 is a block diagram showing a hardware configuration of a web server.

FIG. 3 is a block diagram showing a hardware configuration of the web server 2. Similar to the blog server 3, the web server 2 is configured so as to include a CPU 21, a RAM 22, a memory module 25, an input module 23, a display module 24, and a communication module 26. Because a function of each component is similar to that of the blog server, explanation thereof will be omitted. The memory module 25 stores a webpage file 251, an ID management file 252, and time-period information file 253.

The webpage file 251 stores webpages, such as news articles and images, so as to be updated as needed. The ID management file 252 stores a user ID that can utilize the functions according to the present invention, and a password corresponding to the user ID. The time-period information file 254 stores time-period information corresponding to content on a webpage. That is, a publishing period may be set by some contract to the image to be published by news. CPU 21 refers to the time-period information on the content of the time-period information file 254, and when it determines that the time-period information lapsed, it deletes the related contents from the webpage file 251.

Figure 4:
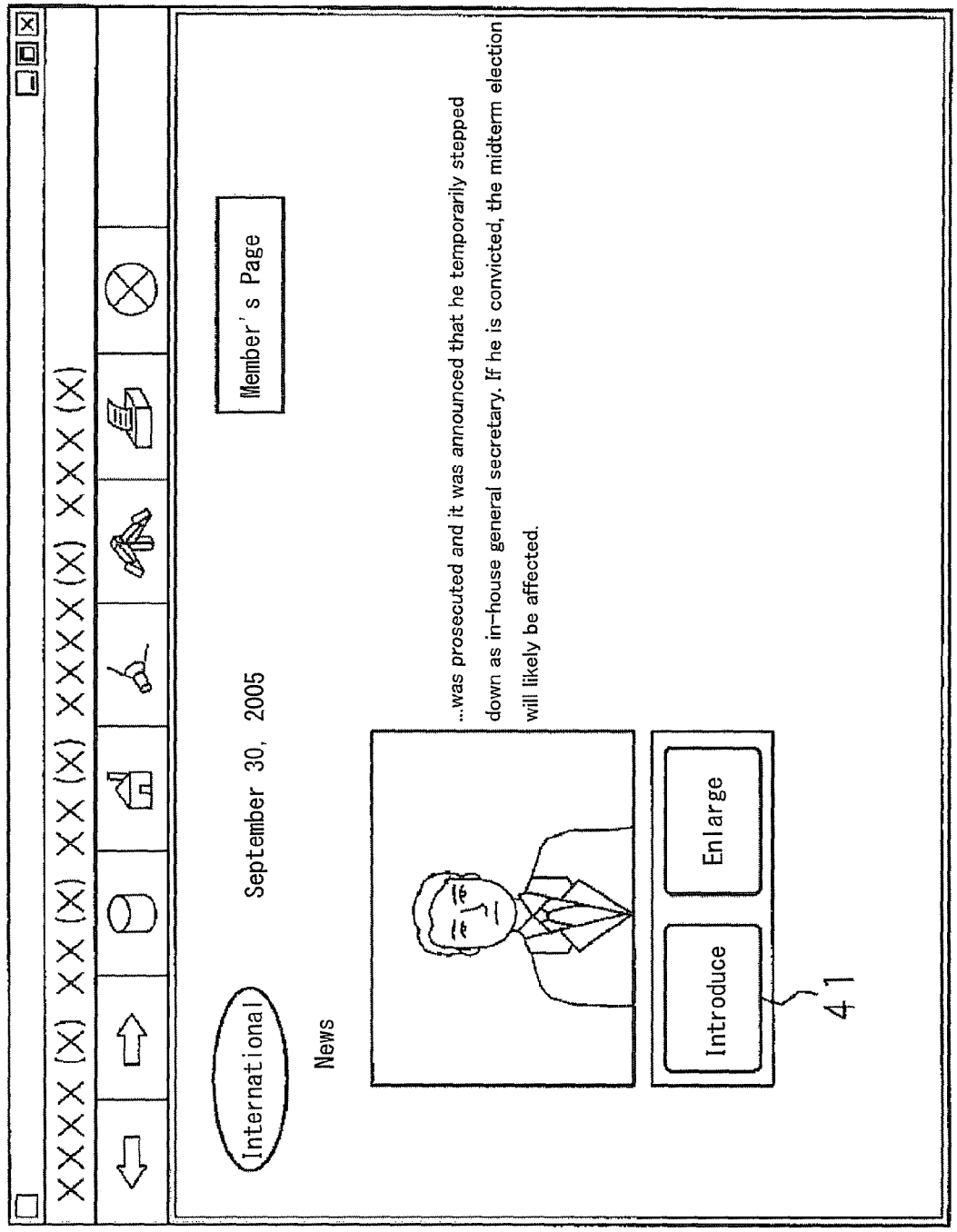
FIG. 4 is an explanatory diagram showing an image of a webpage displayed by accessing the web server.

FIG. 4 is an explanatory diagram showing an image of the webpage displayed by accessing the web server 2. The user computer 1 activates the web browser 152, and then accesses the web server 2 using HTTP (Hyper Text Transfer Protocol). A user inputs a user ID and a password with the input module 13 prior to viewing the webpage. CPU 11 transmits the inputted ID and password to the web server 2 through the communication module 16. CPU 21 of the web server 2 searches the ID management file 252 based on the ID and password that are received by the communication module 26, and then determines whether they are identical to the ID and password stored in the ID management file 252. When it determines that they are identical, a webpage for members in the webpage file 251 is read out, and it is then transmitted to the user computer 1 with the execute information described later.

As shown in FIG. 4, a webpage is displayed on the display module 14 of the user computer 1 by the web browser 152. A date, an article, and an image (or content) are displayed on the webpage, and execute information for executing an introduction of the image is also displayed on the webpage. The execute information may be an "introduce" button 41 displayed on the browser in FIG. 4. The user is allowed to introduce the image by clicking the "introduce" button 41 with the input module 13. The execute information, such as "introduce" is described in HTML (Hyper Text Markup Language) that the execute information is displayed near the image data on the webpage file.

When the user executes the introduction of the image with the input module 13 of the user computer 1, that is, when the user clicks the "introduce" button 41 that is the execute information, an address of the image and copyright information associated with the image is sent to the web browser 152 according to the control program 151 that is the creation program activated in advance. Here, in this embodiment, although it is configured so that the "introduce" button 41 that is the execute information is always displayed below the image on the web browser, it may be displayed only when a mouse pointer that is the input module 13 is located in the image area. In this case, another program may be added so that the execute information is displayed on the webpage by Flash etc., when the mouse pointer is coincident with the image area.

The image shown in FIG. 4 is transmitted to the user computer 1 associated with an address indicating an accessing end of the image, the copyright information, and the time-period information. A tag corresponding to the copyright information and the time information associated with the image is defined in advance by some agreement. For example, handling of articles, images including the tag between websites that deal with news is defined by some agreement according to IPTC (International Press Telecommunications Council). CPU 11 of the user computer 1 extracts the copyright information and the time-period information referring to the tag related to the copyright information and the time-period information that are transmitted in accordance with the control program 151. The extracted copyright information is stored in RAM 12 along with the address of the image, and the time-period information is stored in the time-period information file 153.

Figure 5:
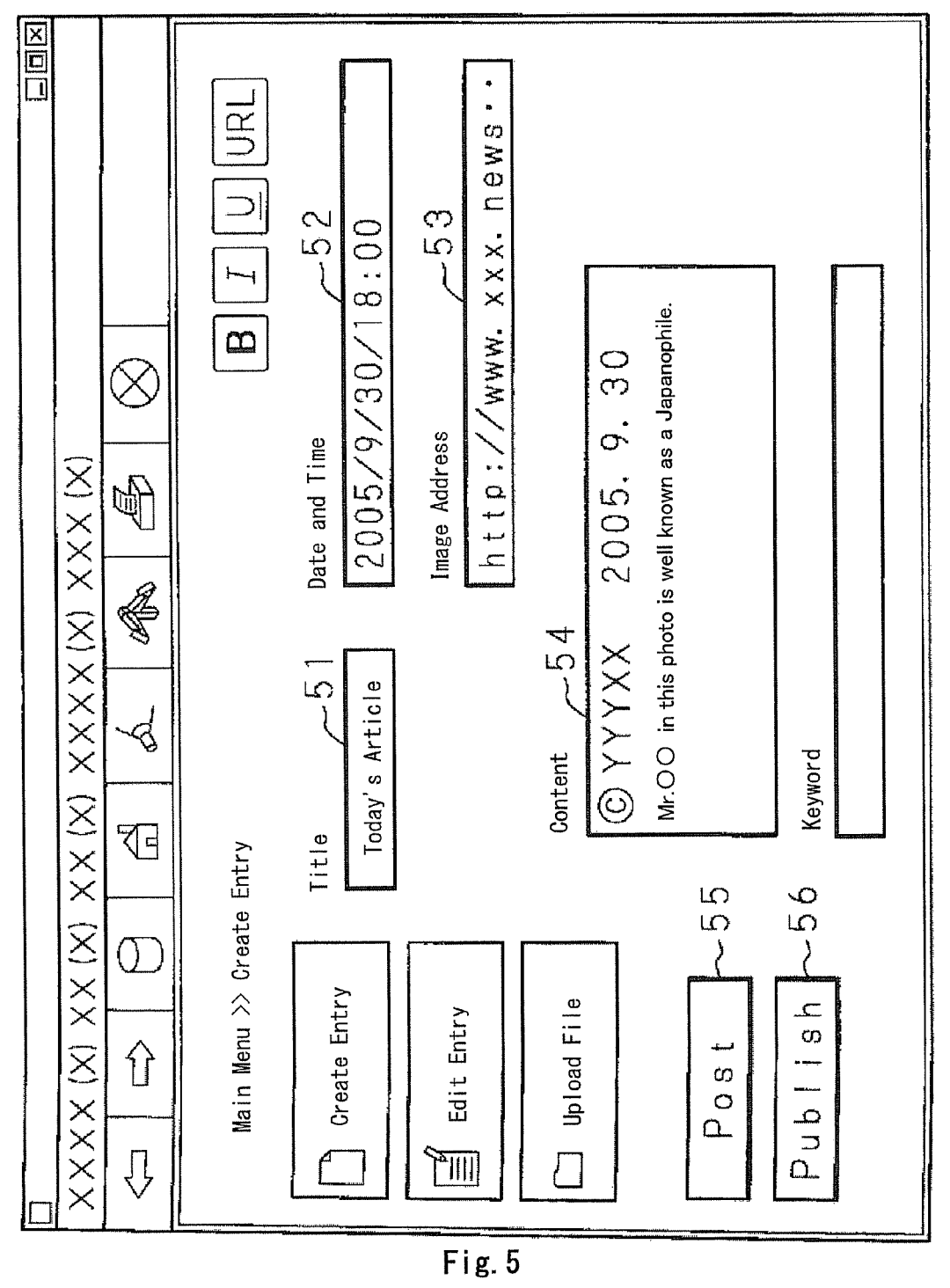

FIG. 5 is an explanatory diagram showing an image of the web browser 152 that is a creation program. The user activates the web browser 152, and then accesses the blog server 3. After an authentication of the user, an edit screen for the blog shown in FIG. 5 is displayed. The web browser 152 is provided with a title input box 51 for the blog, a date and time input box 52, an address input box 53 for the image, a content box 54 into which the user's comment to the content is inputted, and the like. Information inputted in each input box is converted into HTML text, and is saved in the blog file 351 of the blog server 3. In FIG. 4, when the user clicks the "introduce" button 41 that is the execute information with the input module 13 to start an execution of the introduction, CPU 11 describes the present time in the date and time input box 52, extracts from RAM 12 the address of the image transmitted from the web server 2, and sends it to the web browser 152, according to the control program 151. The address of the image sent to the web browser 152 is described in the address input box 53 for the image as shown in FIG. 5.

Similar to this, CPU 11 extracts the copyright information that is transmitted from the web server 2, from RAM 12, according to the control program 151, and then sends it to the web browser 152. The copyright information sent to the web browser 152 is described in the content box 54 as shown in FIG. 5. The user inputs a blog title ("today's article" in FIG. 5) in the title box 51 by the input module 13 so that the blog for the image is completed. Further, following the described copyright information, a comment to the image is inputted into the content box 54 by the input module 13.

When the user finished the input, the user clicks the "Post" button 55 with the input module 13. By the operation of the "Post" button 55, the inputted items are converted into HTML text, and the blog after the conversion is previewed on the webpage 152. When the user determines that the content of the preview is satisfactory, the user then clicks a "Publish" button 56 with the input module 13 to upload the content of the blog to the blog server 3. This blog is stored in the blog file 351 in the blog server 3.

Figure 6:
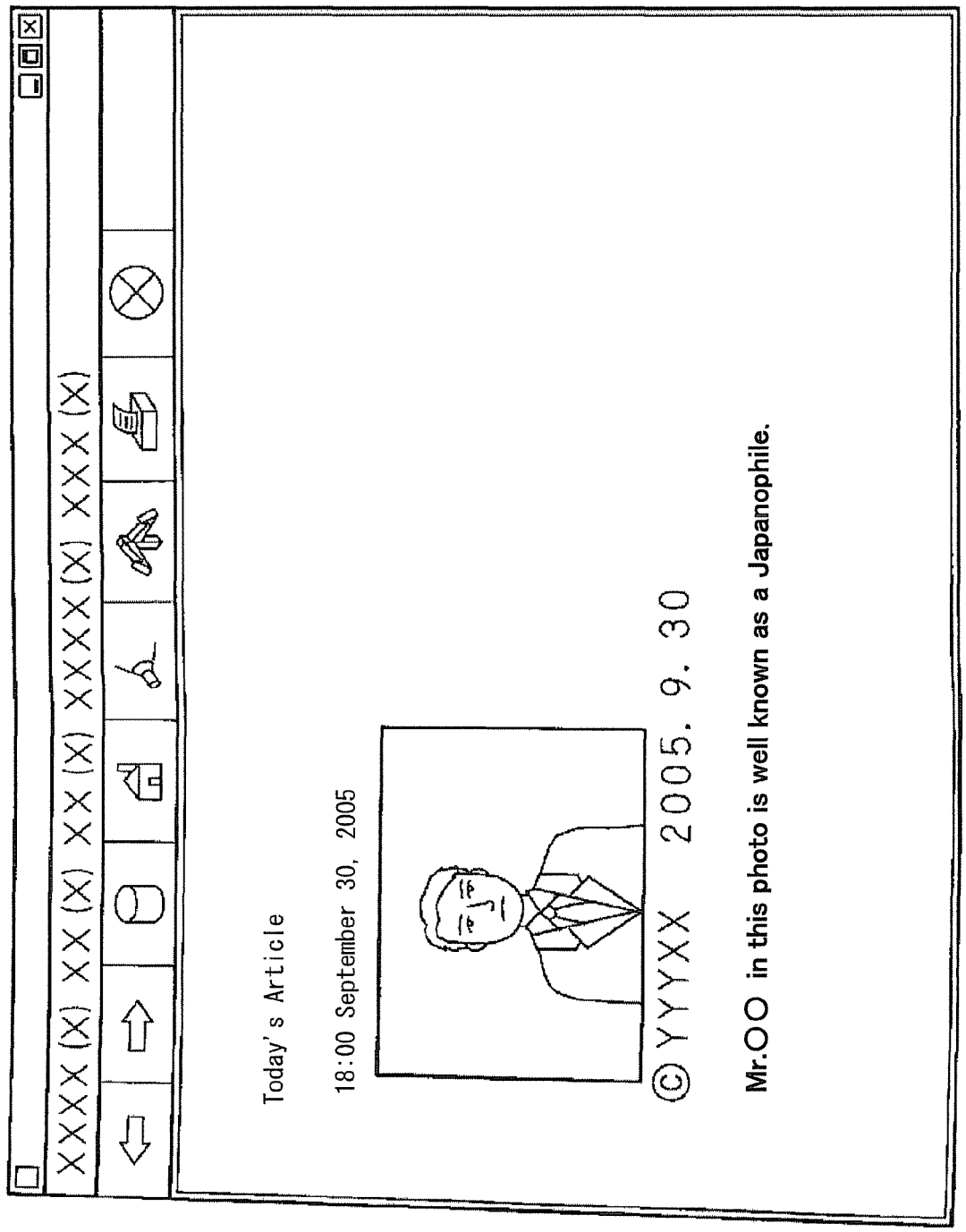
FIG. 6 is an explanatory diagram showing an image of a blog.

FIG. 6 is an explanatory diagram showing an image of the blog. When the third person accesses the blog server 3 to view the blog, CPU 31 reads out the HTML text from the blog file 351, and transmits it to the third person's computer 4. A screen image shown in FIG. 6 is displayed on the browser of the third person's computer 4. The browser of the computer requests the web server 2 for an acquisition of the image for the address with reference to the address of the image, and then displays an image as shown in FIG. 6. Further, the copyright information and the comment ("Mr. OO in this photograph is well known as a Japanophile.") which are described in the content box 54 is displayed below the image. Thus, when the user executes the introduction of the content, and takes the content into the user's blog, the copyright information is sent to the web browser 152 by processing of the control program 151 without the user being conscious, and the copyright information is then added to the blog.

CPU 11 of the user computer 1 may periodically access the time-period information file 153, and compares the time-period information during which the publicizing of stored information corresponding to the uploaded image is permitted with the present date and time to determine whether the publicizing is still possible. When the time period during which the publicizing is permitted lapsed, CPU 11 reads out from the memory module 15 the information indicating that the introduction period ended, and displays it on the display module 14 for warning. Again, the user can access the blog file 351 of the blog server 3 to delete the uploaded address or the comment of the image.

Figure 7:
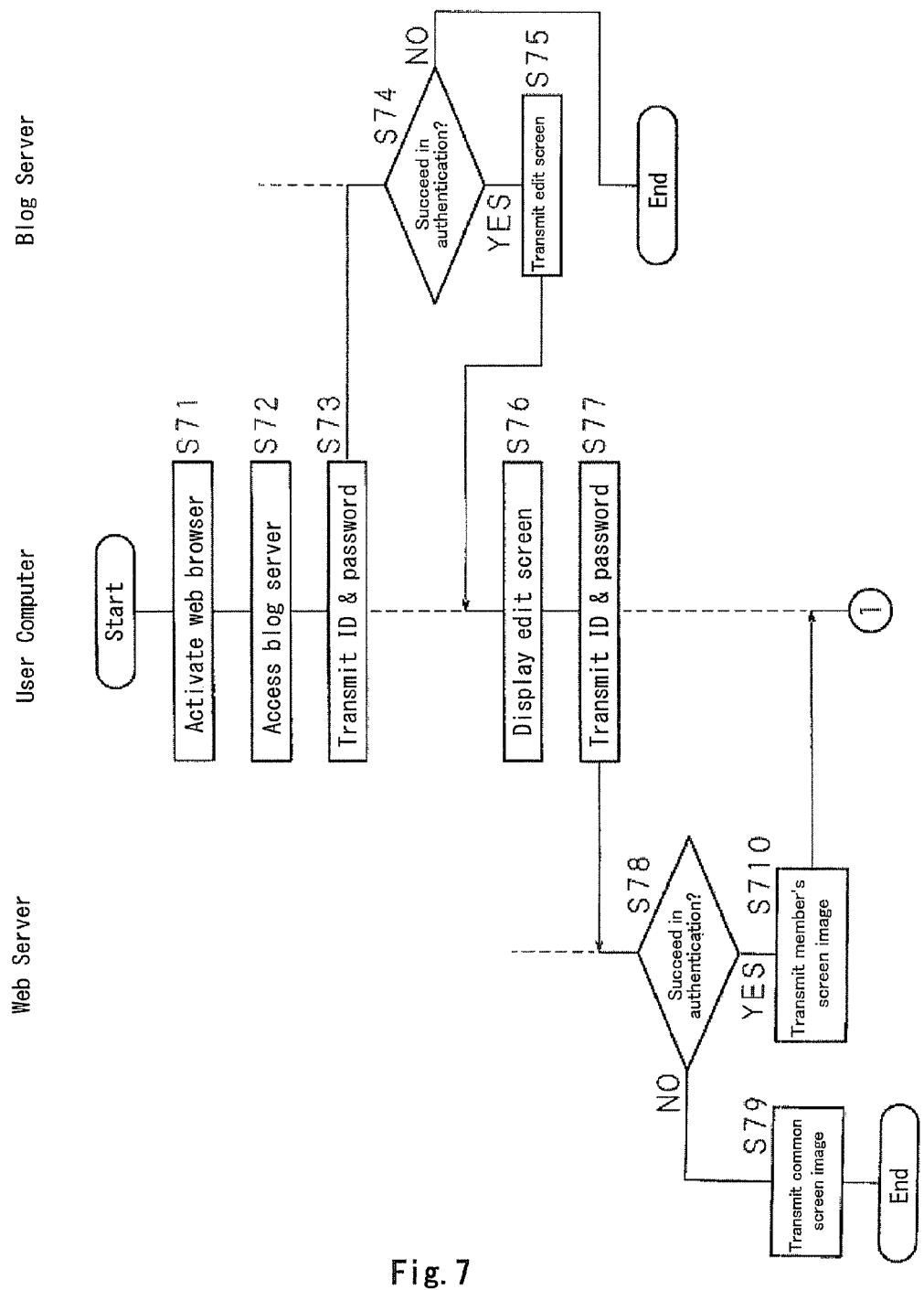
FIG. 7 is a flowchart showing a creation processing procedure of the blog according to a control program.
Figure 8:
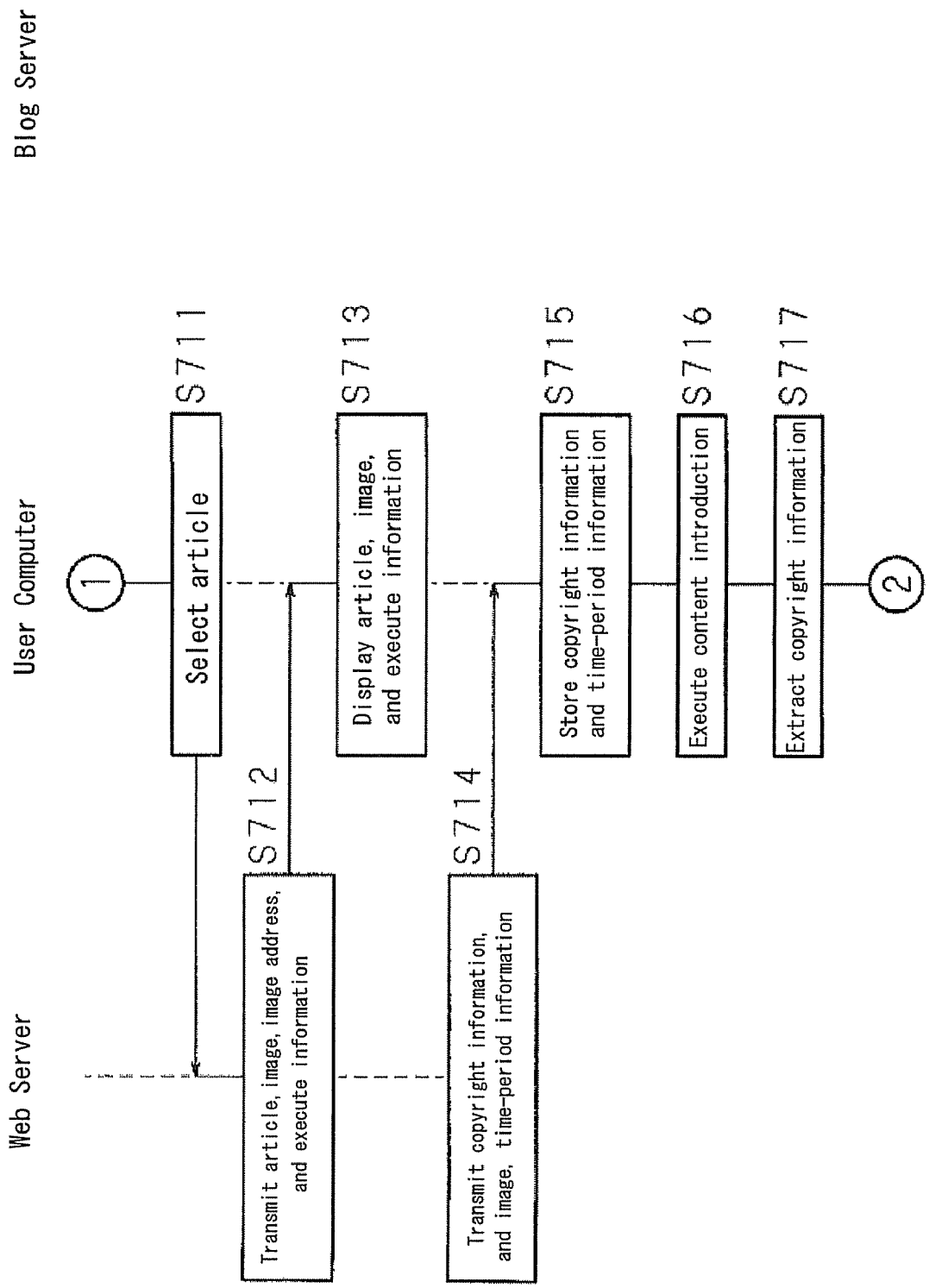
FIG. 8 is a flowchart showing the creation processing procedure of the blog according to the control program.
Figure 9:
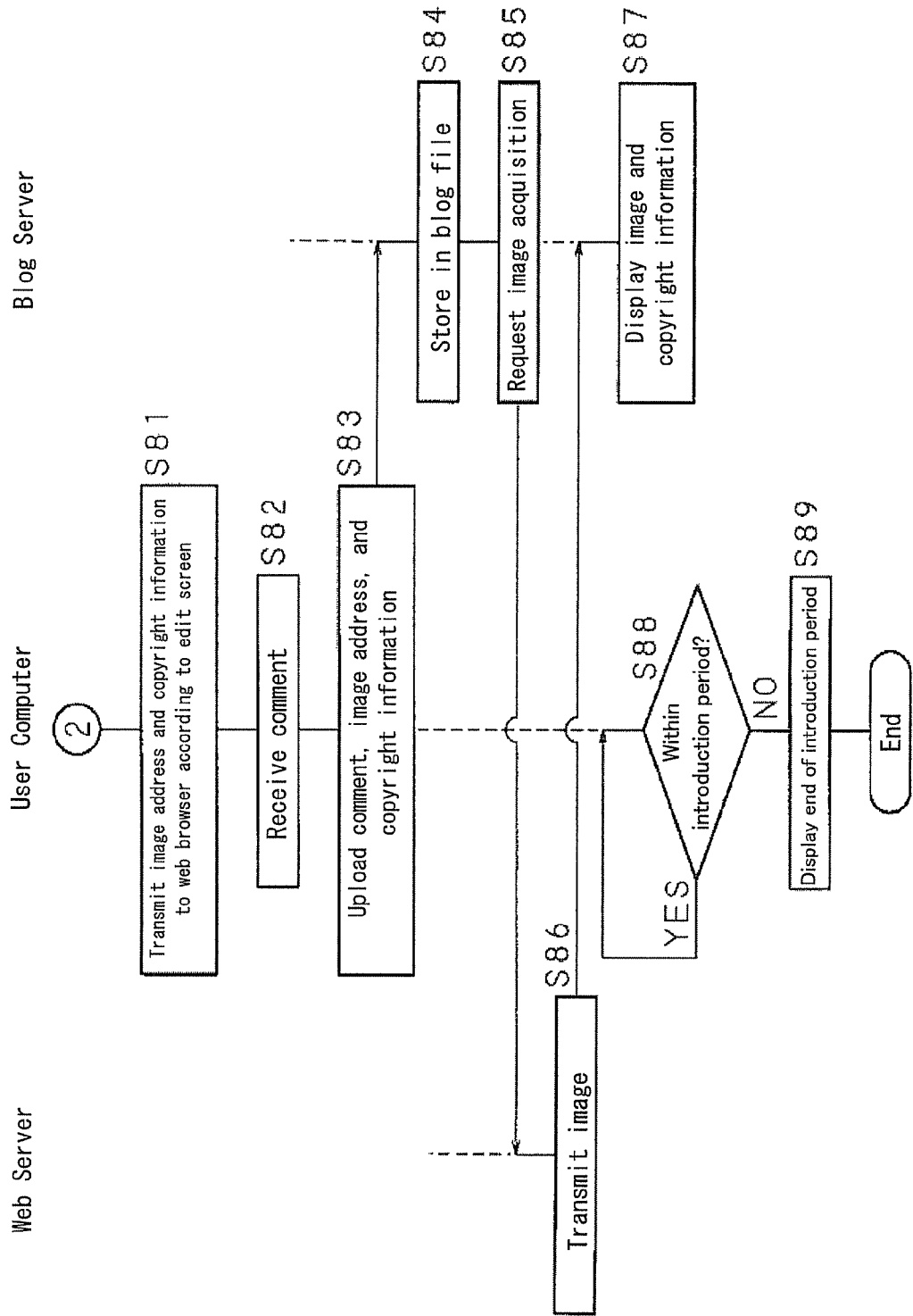
FIG. 9 is a flowchart showing the creation processing procedure of the blog according to the control program.

FIG. 7 or 9 are flowcharts showing a creation processing procedure of the blog according to the control program 151. Based on an instruction of the user from the input module 13, CPU 11 activates the web browser 152 (Step S71). Under the condition of inputting URL related to the blog server 3 by the input module 13, CPU 11 accesses the blog server 3 (Step S72). When the user inputs an ID and a password with the input module 13 for login, CPU 11 receives this input, and transmits the received ID and password to the blog server 3 (Step S73).

The blog server 3 determines whether the ID and password stored in the memory module 35 are identical to the incoming ID and password. CPU 31 terminates this routine when it does not succeed in this authentication (NO in Step S74). On the other hand, when CPU 31 determines that it succeeded in the authentication (YES in Step S74), CPU 31 then transmits the edit screen according to the blog file 351 corresponding to the ID to the user computer 1 (Step S75). CPU 11 of the user computer 1 displays the edit screen transmitted to the web browser 152 as a creation program, as shown in FIG. 5 (Step S76).

Then, CPU 11 activates another web browser 152, and accesses the web server 2 which distributes news, based on the URL inputted with the input module 13. The user inputs the ID and password with the input module 13. CPU 11 transmits the ID and password that are inputted with the input module 13 to the web server 2 (Step S77). The web server 2 determines whether the ID and password stored in the ID management file 252 of the memory module 25 are identical to the incoming ID and password. When CPU 21 does not succeed in the authentication (NO in Step S78), it then transmits a common screen image for non-members to the user computer (Step S79), and then terminates this routine. On the other hand, when CPU 21 determines that it succeeded in the authentication (YES in Step S78), CPU 21 then reads out the webpage stored in the webpage file 251, and then transmits to the user computer as a screen image only for members (Step S710). In the meantime, although the web server 2 requires the input of ID and password in this embodiment, this process may be omitted.

CPU 11 displays the transmitted screen image only for members on the web browser 152 which is activated by a window different from the web browser 152 activated in Step S76. The user views the webpage, and then selects an article to be described in the blog by the input module 13 (Step S711). In response to the request from the input module 13, CPU 21 of the web server 2 transmits information on the webpage related to the article.

CPU 21 transmits the article, the image, the address of the image, and the execute information for executing an introduction of the content to the user computer 1 (Step S712).

Based on the information transmitted from the web server 2, CPU 11 displays the webpage related to the article, as shown in FIG. 4. As shown in FIG. 4, the article, the image, and the "introduce" button 41 that is execute information for executing the introduction of the image are displayed on the web browser 152 (Step S713). Further, CPU 21 reads out the copyright information and the time-period information associated with the image from the webpage file 251, and then transmits them to the user computer (Step S714). When the user computer 1 receives the copyright information, it then stores the information in RAM 12 so as to correspond it to the address information on the image, or when the time-period information is received, it stores the information in the time-period information file 153 so as to correspond it to the address information on the image (Step S715).

When the execution of the content introduction is performed in association with the execute information from the input module 13 for executing the introduction of the content, that is, when the "introduce" button 41 associated with the image is selected by the input module 13 (Step S716), CPU 11 then extracts the copyright information from RAM 12 (Step S717). Then, CPU 11 sends the address of the image transmitted in Step S712 and the copyright information transmitted in Step S714 to the web browser 152 activated in Step S76 that is a creation program (Step S81).

CPU 11 displays the sent image address in the address input box 53 of the image of the web browser 152, and further displays the sent copyright information in the content box 54, as shown in FIG. 5. CPU 11 receives a comment of the user to the image inputted with the input module 13 (Step S82), and displays it in the content box 54. When CPU 11 receives an operation of the "Post" button 55 or the "Publish" button 56 with the input module 13, it uploads (or transmits) the image address displayed in the address input box 53, the copyright information displayed in the content box 54, and the comment to the blog server 3 (Step S83).

CPU 31 of the blog server 3 refers to the user's ID, and stores the uploaded image address, copyright information, and comment in the corresponding blog file 351 (Step S84). When there is an access from the third person's computer 4 to the blog server 3, and a viewing request for the user's blog is received, CPU 31 transmits the blog including the image address, copyright information, and comment that are uploaded to the blog file 351 to the third person's computer 4. The third person's computer 4 displays the transmitted blog on the web browser, while it requests an acquisition of the image to the web server 2 with reference to the transmitted image address (Step S85).

When CPU 21 of the web server 2 receives the acquisition request for the image, it reads out a corresponding image from the webpage file 251 with reference to the transmitted image address, and transmits the read-out image to the third person's computer 4 which is a requestor through the communication module 26 (Step S86). The third person's computer 4 displays the blog transmitted from the blog server 3 and described in HTML, and the image transmitted from the web server 2 on a web browser. Near the transmitted image, the copyright information is displayed on the web browser along with the comment (Step S87).

CPU 11 of the user computer compares the time-period information stored in the time-period information file 153 in Step S715 and the present date and time at an appropriate timing, and then determines whether the image to be introduced falls within the introduction period (Step S88). When CPU 11 determines that it falls within the introduction period (YES in Step S88), CPU 11 repeats the above routine until the introduction period lapsed. On the other hand, when CPU 11 determines that it does not fall within the introduction period (NO in Step S88), CPU 11 reads out an indication that the introduction period of the image is ended from the memory module 15, and displays it on the display module 14 (Step S89). Thus, even when the introduction period of the image lapsed, the user can easily know that the end-time, and is possible to delete the article related to the image from the blog.

In addition, similarly, if the content is an article, such as text, the execute information for introducing the content is displayed near the article, and the copyright information associated with the article is transmitted to the user computer 1. Further, the address corresponding to the article is also transmitted to the user computer 1, and a similar routine to the image is performed.

(Embodiment 2)

Figure 10:
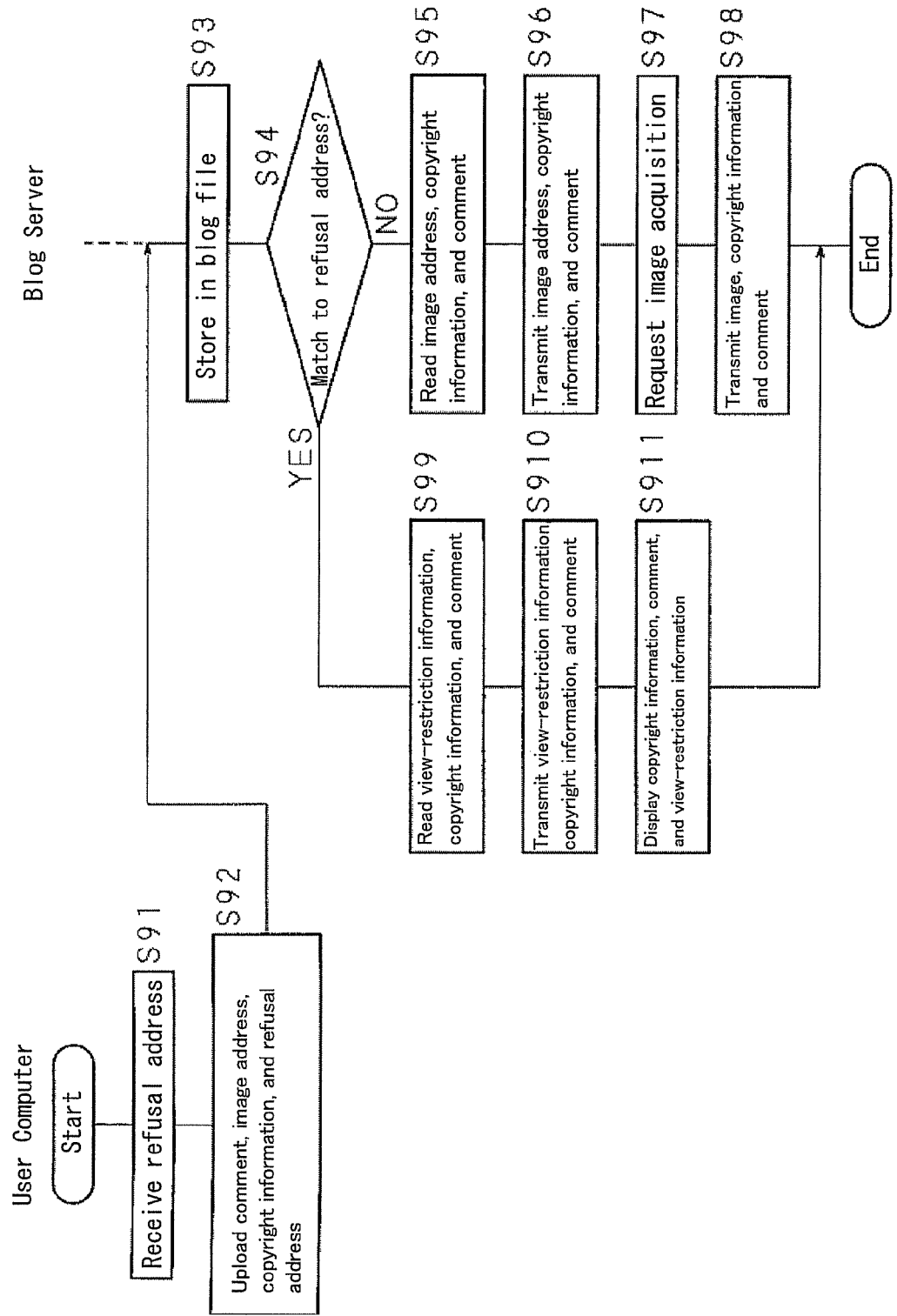
FIG. 10 is a flowchart showing a procedure of a view-restriction process according to Embodiment 2.

Embodiment 2 relates to a mode in which a view restriction of the blog is performed. FIG. 10 is a flowchart showing a procedure of a view-restriction process according to Embodiment 2. First, CPU 11 of the user computer 1 receives an input of a refusal address for which viewing of an introduced blog is restricted, from the input module 13 (Step S91). As for the refusal address, an IP address may be used, for example. Similar to Step S83, CPU 11 uploads a comment, an address of the image, copyright information, and the received refusal address to the blog server 3 (Step S92).

CPU 31 of the blog server 3 refers to the user's ID, and then stores the uploaded comment, address of the image, copyright information, and received refusal address to the blog file 351 (Step S93). When there is a viewing request for a blog from the third person's computer 4, CPU 31 then compares the IP address of the computer according to the viewing request with the refusal address stored in the blog file 351, and determines whether one is identical to the other (Step S94). When CPU 31 determines that they are not identical (NO in Step S94), it reads out an image address, copyright information, and comment from the blog file 351 (Step S95). Then, the read-out image address, copyright information, and comment are transmitted to the IP address which made the viewing request (Step S96).

The web browser of the third person's computer 4 refers to the transmitted address of the image, and then performs an acquisition request for the image to the web server 2 (Step S97). Then, the web browser displays the transmitted image, as well as the copyright information and the comment (Step S98). On the other hand, when CPU 31 determines that it is identical to the refusal address (YES in Step S94), it reads out the view-restriction information stored in the memory module 35, and reads out the copyright information and the comment from the blog file 351 (Step S99). Then, CPU 31 transmits the view-restriction information, the copyright information, and the comment that are read out to the IP address according to the third person's computer 4 with view restriction (Step S910). The web browser of the third person's computer 4 which received them does not display the image with the view restriction, and instead, it displays the view-restriction information, and further, it displays the copyright information and the comment (Step S911). Thus, by a user who performs the introduction performing the view restriction, a newspaper publishing company which administrates the web server 2 may be possible to reliably permit the user to create a blog.

This Embodiment 2 is configured as above, and because other configuration and operations are similar to that of Embodiment 1, similar reference numerals are given to corresponding components and, thus, the detailed explanation thereof will be omitted.

(Embodiment 3)

The computer program for operating the user computer 1 may also be provided as a portable-type recording medium, such as a CD-ROM, MO to Embodiments 1 and 2 described above, like the this Embodiment 3. Further, it is also possible to provide the computer program by transmitting as a subcarrier via a communication line. Below, the description thereof will be explained.

Figure 11:
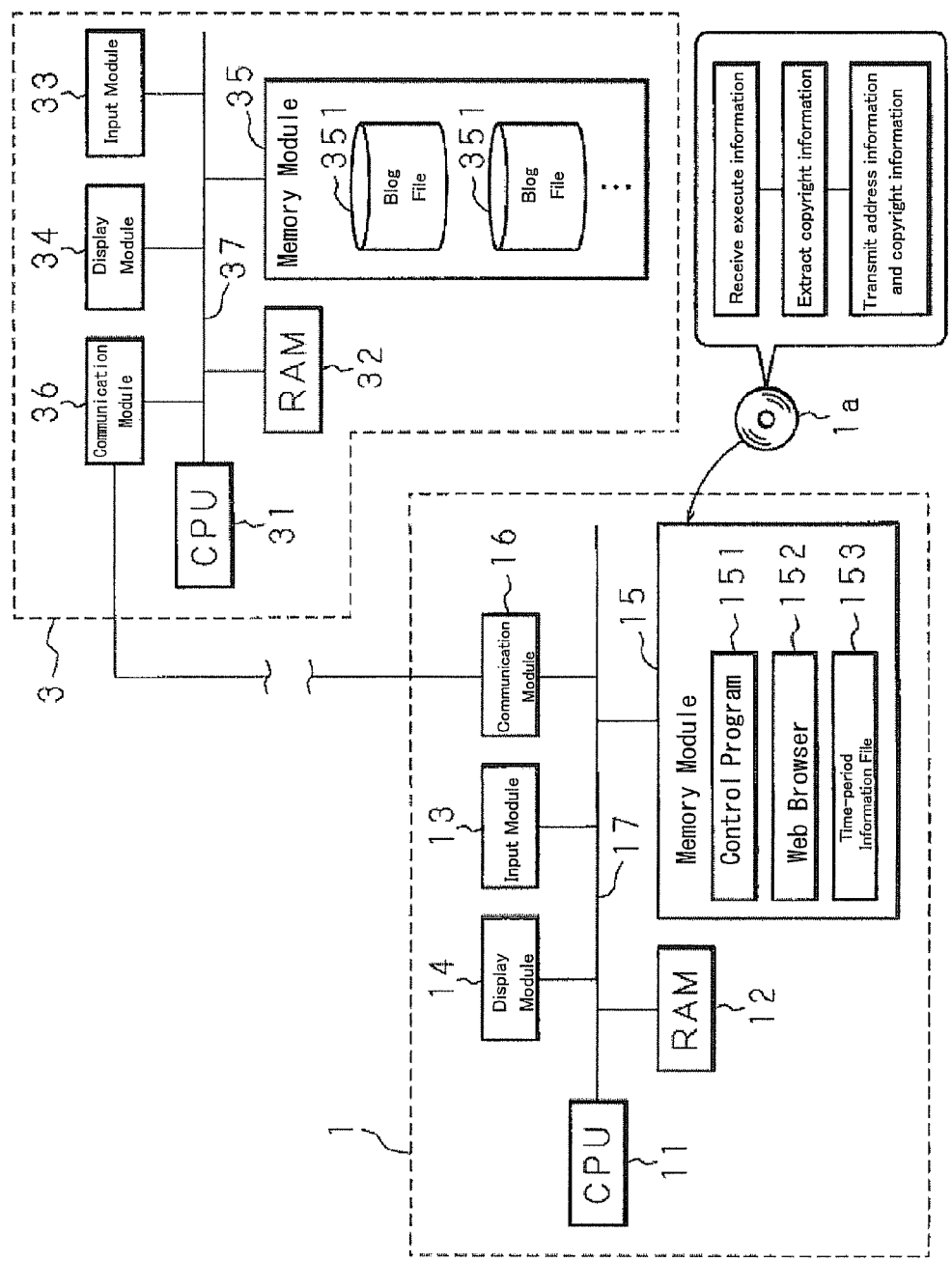
FIG. 11 is a block diagram showing a hardware configuration of a user computer and a blog server according to Embodiment 3.

FIG. 11 is a block diagram showing a hardware configuration of a user computer 1 and a blog server 3 according to Embodiment 3. A recording medium 1a (CD-ROM, MO, DVD-ROM, or the like) with which a program that causes a recording-medium reading device (not illustrated) of the user computer 1 shown in FIG. 11 to receive the execute information, extract the copyright information, and send the address information and the copyright information is recorded is installed in the memory module 15. Alternatively, this program may be downloaded from an external computer through the communication module 16, and may be installed in the memory module 15. This program is loaded to RAM 12 of the user computer 1 to be executed. Thus, this program may function as the user computer 1 of the invention as described above.

This Embodiment 3 is configured as above, and because other configuration and operations are similar to that of Embodiments 1 and 2, similar reference numerals are given to corresponding components and, thus, the detailed explanation thereof will be omitted.

(Embodiment 4)

Figure 12:
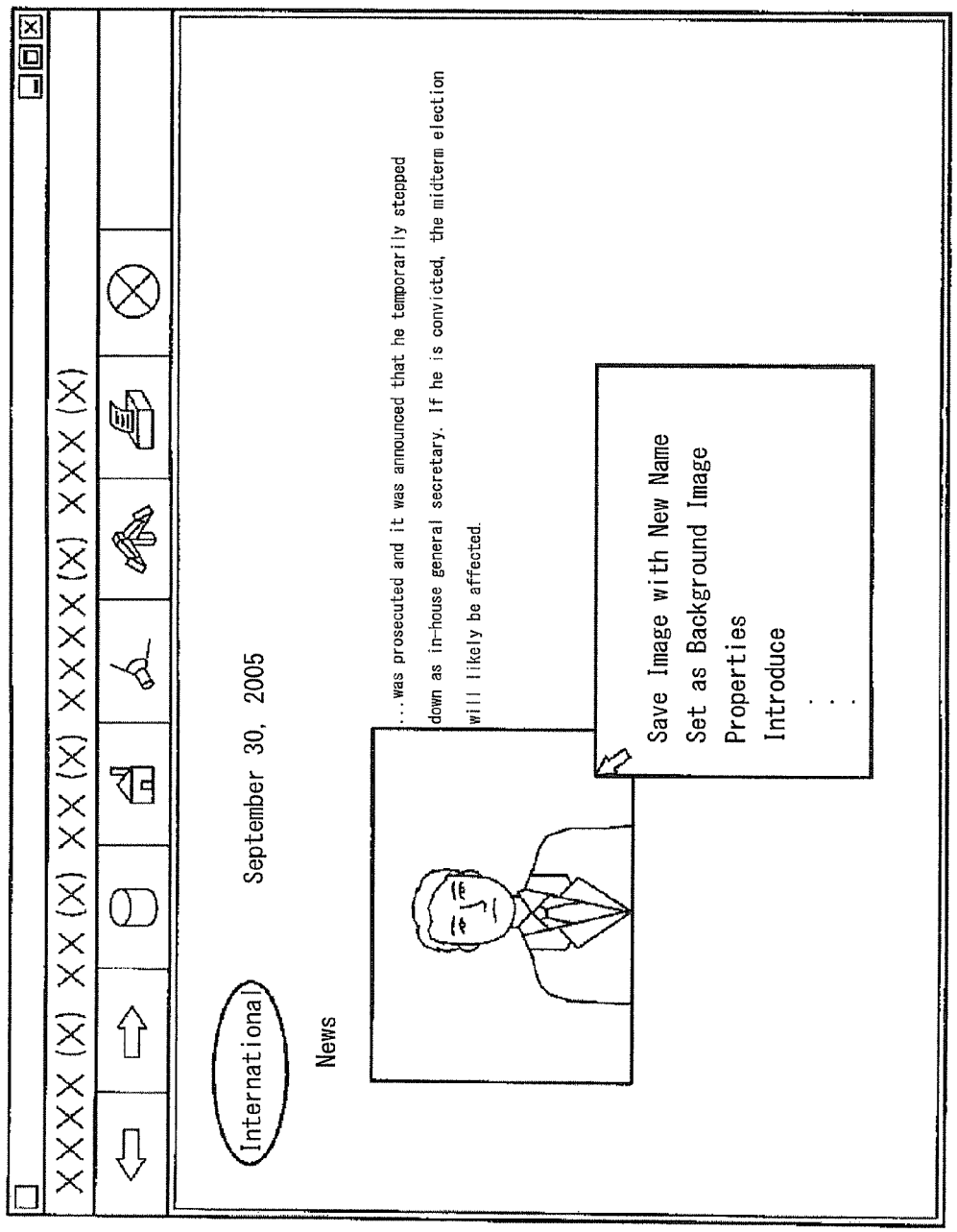
FIG. 12 is an explanatory diagram showing an image of a webpage displayed by accessing a web server.

The introduction process of content may be performed by the user computer 1 as described below. FIG. 12 is an explanatory diagram showing an image of a webpage displayed by accessing the web server 2. Same as Embodiment 1, an article transmitted from the web server 2 is displayed on the web browser 152. When a user right-clicks desired content to be introduced by the input module 13 (in this example, the image is right-clicked), a separate window is displayed, and "introduce" as well as "properties" are displayed, as shown in FIG. 11.

When a user clicks this "introduce" by the input module 13, CPU 11 extracts an address of the image, and copyright information associated with the image, and then sends the extracted image address and copyright information to the web browser 152 actuated as a separate window. The sent image address and copyright information are displayed as shown in FIG. 5. Thus, the processes described in Embodiment 1 may be added to the web browser 152 as a plug-in.

Figure 13:
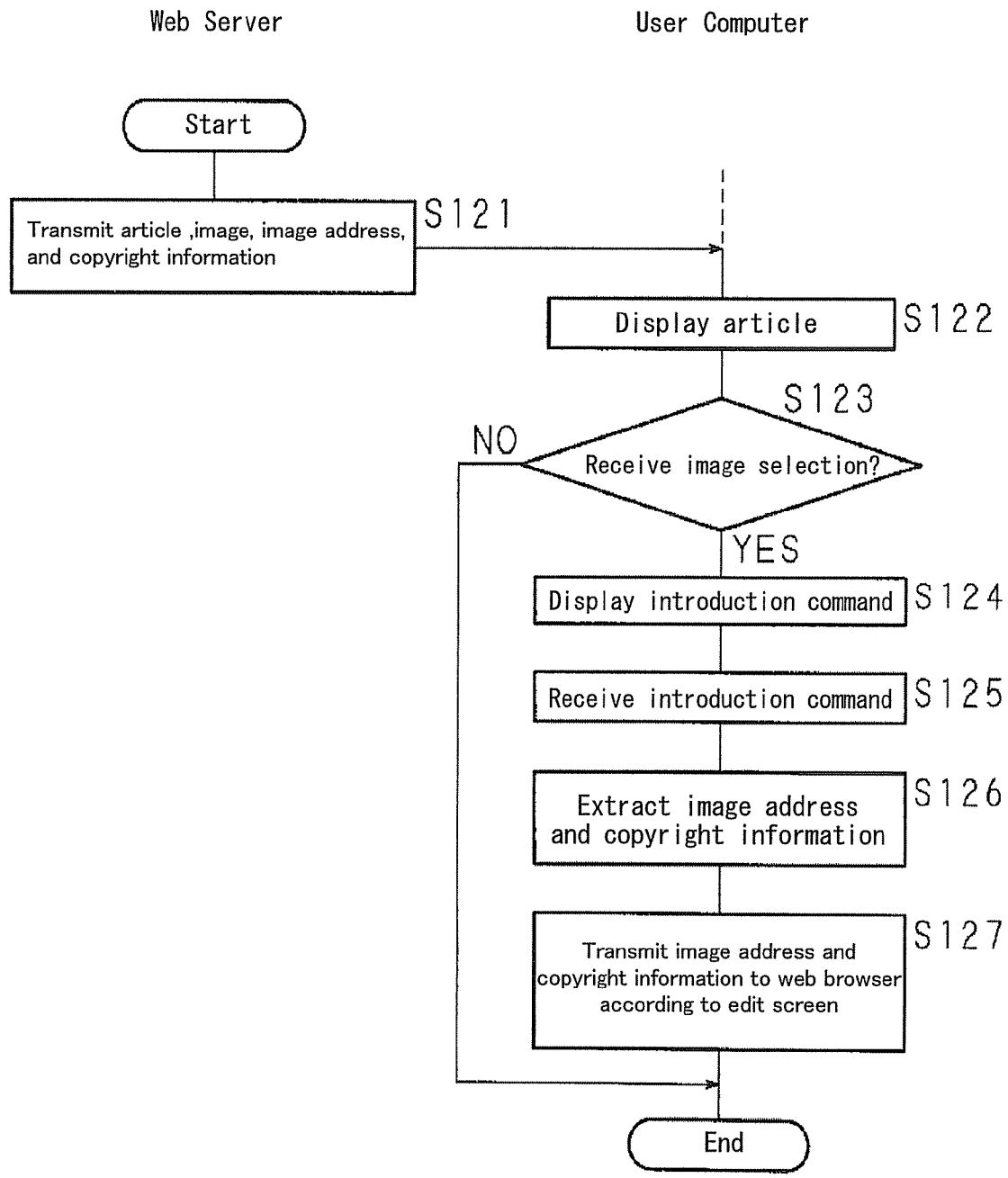
FIG. 13 is a flowchart showing a procedure of a creation processing according to Embodiment 4.

FIG. 13 is a flowchart showing a procedure of a creation process according to Embodiment 4. Because the processes of Step S71 through Step S76 are similar to that of Embodiment 1, explanation thereof will be omitted. In response to a request from the user computer 1, CPU 21 of the web server 2 reads out an article, an image, and an address of the image, and copyright information from the webpage file 251, and then transmits them to the user computer 1 (Step S121). The web browser 152 of the user computer 1 displays the transmitted article, as shown in FIG. 11 (Step S122). CPU 11 determines whether it received a selection of the image from the input module 13 so that the user introduces the image (Step S123). When CPU 11 determines that the selection of the image is not received (NO in Step S123), it terminates the creation process.

On the other hand, when CPU 11 determines that it received the selection of the image (YES in Step S123), for example, when a right-click is performed on the image area by the input module 13, CPU 11 displays an introduction command ("introduce" in the figure) on the window of the web browser 152, as shown in FIG. 11 (Step S124). In the meantime, in the case that the content is text, such as an article, a target area is specified by dragging on the article to be introduced by the input module 13, and when the target area is right-clicked, the introduction command ("introduce" in the figure) may be displayed on the window of the web browser 152, as shown in FIG. 11. The user selects the introduction command with the input module 13 when he/she desires to introduce the image. CPU 11 receives this introduction command (Step S125), and then extracts the address and the copyright information on the image (Step S126).

Then, CPU 11 sends the extracted image address and copyright information to the separate web browser 152 that is a creation program actuated in Step S71 (Step S127). Here, because the processes after this are similar to those explained in Embodiment 1, explanation thereof will be omitted.

The computer program for realizing the functions of the user computer 1 according to this embodiment may also be provided as a portable-type recording medium, such as CD-ROM, MO, etc. Further, it may be possible to provide the computer program by propagating as a subcarrier via a communication line. Below, the description thereof will be explained.

Figure 14:
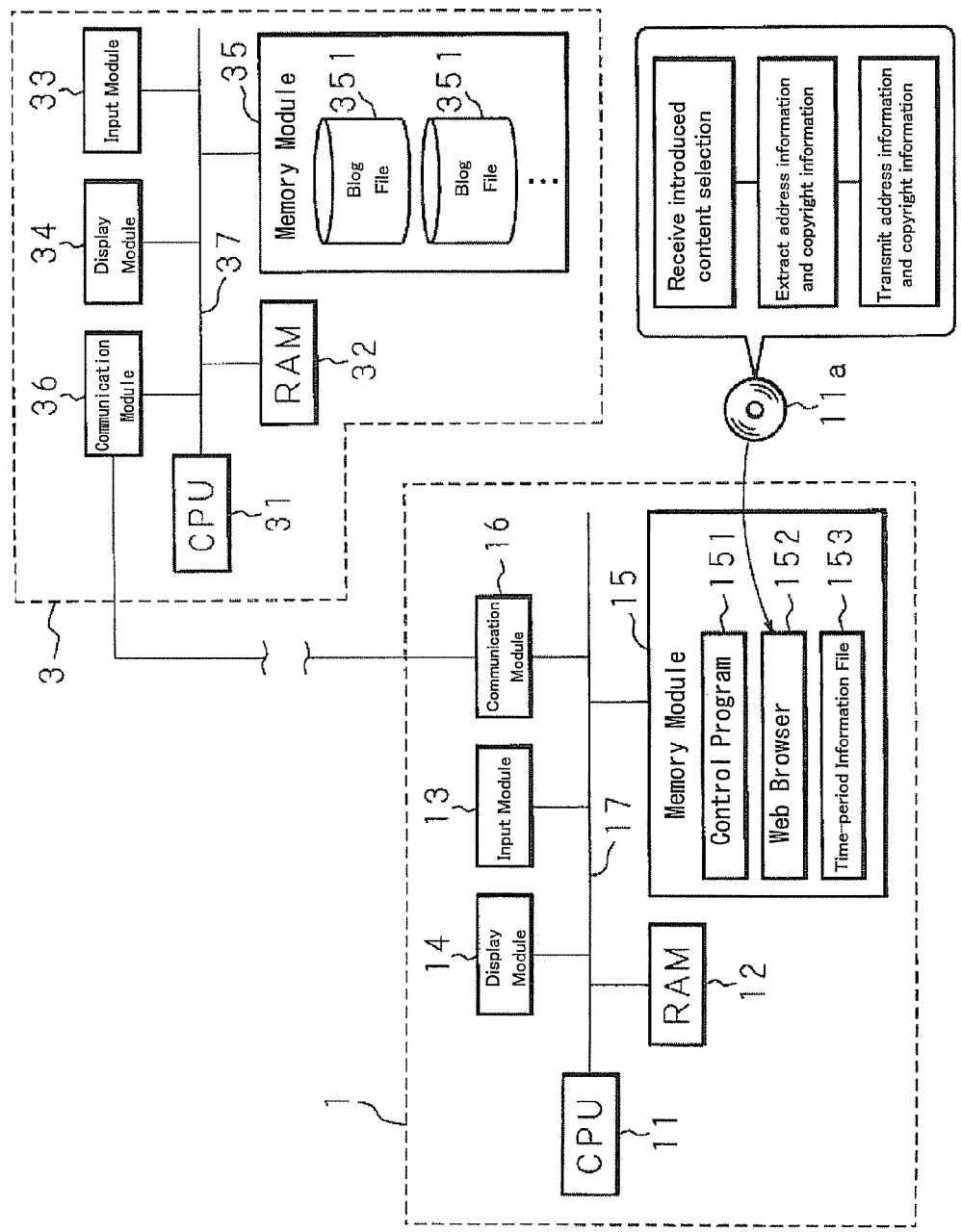
FIG. 14 is a block diagram showing a hardware configuration of a user computer and a blog server according to Embodiment 4.

FIG. 14 is a block diagram showing a hardware configuration of the user computer 1 and the blog server 3 according to Embodiment 4. A recording medium 11a (CD-ROM, MO, DVD-ROM, or the like) with which a program causes the recording-medium reading device (not illustrated) of the user computer 1 shown in FIG. 13 to receive the selection of the introduction content, extract the address information and the copyright information, and sends the address information and the copyright information is recorded is installed in the web browser 152 of the memory module 15 as a plug-in software. Alternatively, this program may be downloaded from an external computer through the communication module 16, and may be installed as plug-in software of the web browser 152. This program is loaded to RAM 12 of the user computer 1 to be executed. Thus, the program functions as the user computer 1 of the invention described above.

This Embodiment 4 is configured as above, and because other configuration and operations are similar to that of Embodiments 1-3, similar reference numerals are given to corresponding components and, thus, the detailed explanation thereof will be omitted.

(Embodiment 5)

Figure 15:
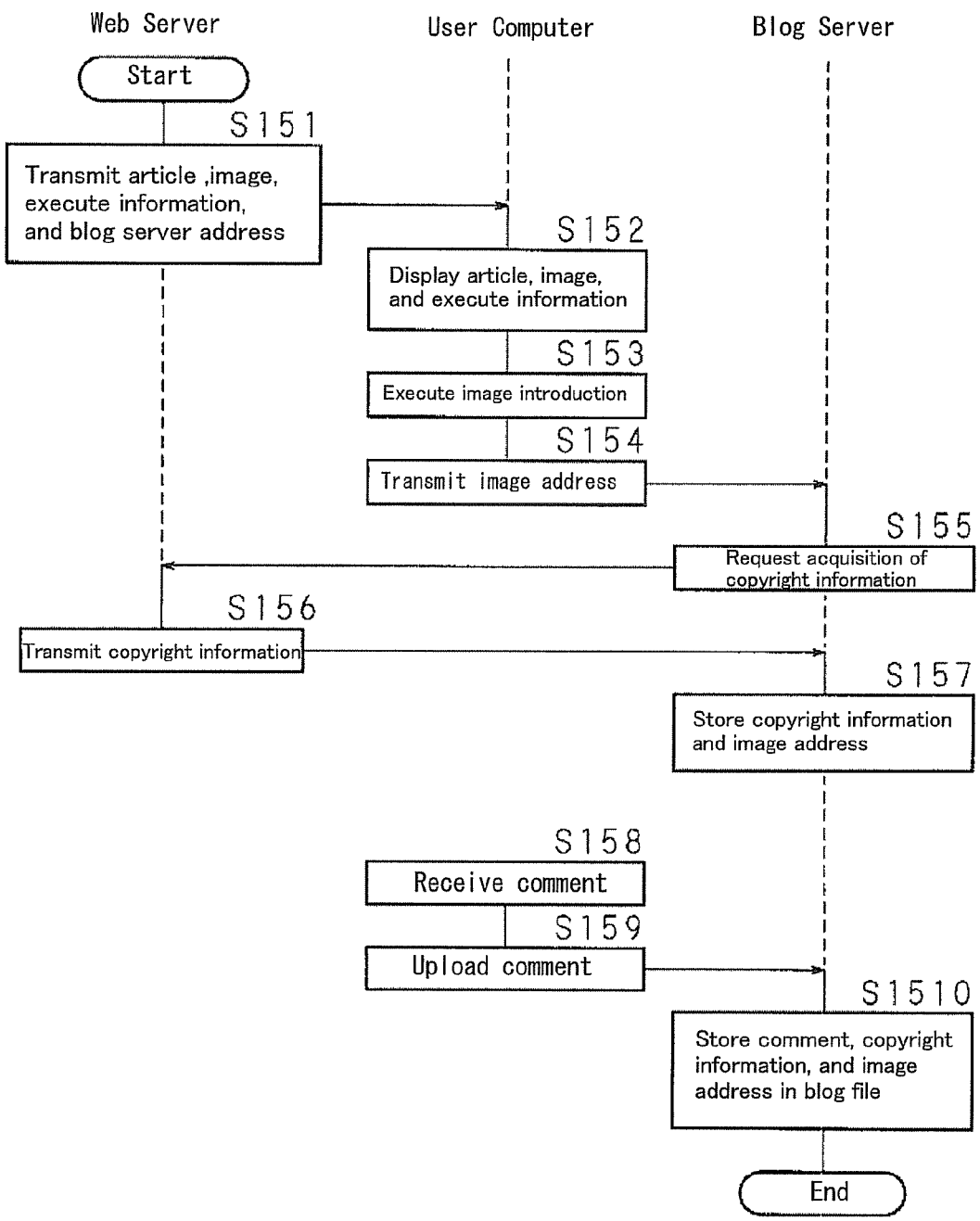
FIG. 15 is a flowchart showing a procedure of a creation processing according to Embodiment 5.

In Embodiment 1, although it is configured that the user computer 1 acquires the copyright information and uploads it to the blog server 3, the blog server 3 may acquire the copyright information. Herein below, the description will be explained using a flowchart. FIG. 15 is a flowchart showing a procedure of a creation process according to Embodiment 5. Because the processes of Step S71 through Step S711 are similar to that of Embodiment 1, explanation thereof will be omitted. After Step S711, CPU 21 of the web server 2 transmits the selected article, image, execute information, and the address of the blog server 3 to the user computer 1 (Step S151).

This execute information to be transmitted is described with hyperlink in which an address for accessing the blog server 3 is described in addition to those described in Embodiment 1. That is, in addition to HTML for displaying the "introduce" button 41, HTML in which URL of the blog server 3 is described is inserted, and a screen image shown in FIG. 4 is displayed on the web browser 152. CPU 11 of the user computer 1 causes the web browser 152 to display the execution to which an article, an image, and a hyperlink to the blog server 3 are added on the display module 14 (Step S152). When an introduction of the image is executed by an instruction of the user from the input module 13 (Step S153), that is, when CPU 11 determines that there is an access request to the hyperlink for the blog server 3 in response to a click of the "introduce" button 41 with the input module 13, CPU 11 accesses the blog server 3, extracts the address of the image to be introduced from the web browser 152, and then transmits it to the blog server 3 (Step S154).

When the address of the image is transmitted in response to an access from the user computer 1 which has already logged in, CPU 11 of the blog server 3 stores the transmitted address to the blog file 351 in the memory module 35. Then, CPU 31 accesses the web server 2 referring to the transmitted address of the image, and performs an acquisition request for the copyright information corresponding to the address of the image to be introduced (Step S155). CPU 21 of the web server 2 reads out the copyright information corresponding to the address of the image to be introduced from the webpage file 251, and then transmits it to the blog server 3 (Step S156). Here, the acquisition of the copyright information may be performed as follows. CPU 31 accesses the web server 2 referring to the address of the image transmitted from the user computer 1, and then receives the image and the copyright information associated with the image. Thus, an appropriate means for simultaneously receiving the image and the copyright information on the image stored in the webpage file 251 of the web server 2, or receiving the copyright information only may be adapted.

CPU 31 of the blog server 3 stores the transmitted copyright information so as to correspond it to the address of the image stored in the blog file 351 (Step S157). With the above processes, the address and the copyright information of the image which the user desires to introduce are uploaded to the user's blog so as to correspond to each other. Then, the user inputs a comment with the input module 13 to describe the comment to the image to be introduced. CPU 11 then receives the comment inputted from the input module 13 (Step S158), and uploads the inputted comment to the blog server 3 when triggered by an operation of the "Post" button 55 or the "Publish" button 56 with the input module 13 (Step S159).

CPU 31 of the blog server 3 stores the transmitted comment so as to correspond it to the copyright information and the image address stored in the blog file 351 of the user (Step S1510). Because subsequent processes are similar to that described in Step S85, detailed explanation thereof will be omitted. Thus, the blog stored in the blog file 351 may be viewed by accessing from the third person's computer 4. However, in this case, the address of the image and the copyright information are read out corresponding to the comment, and are displayed on the blog file 351. Therefore, it is possible to protect the copyright of the content with easy operations at the blog server 3 end.

What is claimed is:

1. An information introducing system including a creation device for creating a webpage on which content stored in a web server is posted, the creation device comprising:
   a first memory having stored thereon computer-executable instructions that, in response to execution by a first processor, cause the creation device to perform first operations, the first operations including:
      receiving content, a content address of the content, copyright information on the content, and display-component information corresponding to a display-component for receiving an instruction for posting the content that are transmitted from the web server;
      storing the copyright information in a memory module so as to correspond the copyright information to the content address;
      displaying, on a display module, the display-component corresponding to the display-component information with the content;
      extracting the content address of the content displayed with the display-component and the copyright information corresponding to the content address, from those stored in the memory module, in response to reception of the instruction for posting the content by the displayed display-component; and
      describing the content address and copyright information on an edit page for the webpage to be created.

2. The information introducing system of claim 1, further comprising an open server computer connected with the creation device through a communication network;
   wherein the first operations further include:
      receiving a comment related to the content displayed on the display module;
      describing the comment on the edit page; and
      transmitting described information on the edit page to the open server computer.

3. The information introducing system of claim 2, wherein the open server computer includes:
   a second memory having stored thereon computer-executable instructions that, in response to execution by a second processor, cause the open server computer to perform second operations, the second operations including
      storing, in a server memory module, the described information on the edit page transmitted from the creation device; and
      reading the content address, the copyright information, and the comment from the described information on the edit page stored in the server memory module, in response to receipt of a view-request for the webpage related to the edit page from outside, and transmitting the content address, the copyright information, and the comment to an outside view-request terminal.

4. The information introducing system of claim 3, wherein the first operations further include:
      receiving a refusal address of an accessing end to be refused for viewing the content corresponding to the content address described on the edit page; and
      transmitting the refusal address to the open server computer;
   wherein the open server computer stores view-restriction information in advance; and the second operations further include:
      storing the refusal address transmitted from the creation device in the server memory module so as to correspond the refusal address to describing content on the edit page on which the content address of the content associated with the refusal address is described;
      comparing an address of an outside view-request terminal with the refusal address in response to receipt of the view-request for the webpage related to the edit page from outside; and
      reading the view-restriction information from stored information, in response to a determination that the address of the outside view-request terminal is identical to the refusal address, and transmitting the view-restricted information to the outside view-request terminal.

5. The information introducing system of claim 1,
   wherein the first instructions further include:
      storing, in advance, end information indicating that a publishable period of the content is ended;
      storing time-period information transmitted from the web server in the memory module so as to correspond the time-period information to the content address of the content associated with the time-period information, the time-period information defining a time period during which publicizing of the content is permitted;
      comparing the time-period information with a present date and time; and
      displaying the end information on the display module for the content in relation to the content address corresponding to the time-period information, in response to a determination that the time period defined by the time-period information lapses.

6. The information introducing system of claim 2,
   wherein the first operations further include:
      storing, in advance, end information indicating that a publishable period of the content is ended;
      storing time-period information transmitted from the web server in the memory module so as to correspond the time-period information to the content address of the content associated with the time-period information, the time-period information defining a time period during which publicizing of the content is permitted;
      comparing the time-period information with a present date and time; and
      displaying the end information on the display module for the content in relation to the content address corresponding to the time-period information, in response to a determination by that the time period defined by the time-period information lapses.

7. The information introducing system of claim 3,
   wherein the first operations further include:
      storing, in advance, end information indicating that a publishable period of the content is ended;
      storing time-period information transmitted from the web server in the memory module so as to correspond the time-period information to the content address of the content associated with the time-period information, the time-period information defining a time period during which publicizing of the content is permitted;

comparing the stored time-period information with a present date and time; and displaying the end information on the display module for the content in relation to the content address corresponding to the time-period information, in response to a determination that the time period defined by the time-period information lapses.

8. The information introducing system of claim 4, wherein the first operations further include:

storing, in advance, end information indicating that a publishable period of the content is ended;

storing time-period information transmitted from the web server in the memory module so as to correspond the time-period information to the content address of the content associated with the time-period information, the time-period information defining a time period during which publicizing of the content is permitted;

comparing the time-period information with a present date and time; and displaying the end information on the display module for the content in relation to the content address corresponding to the time-period information, in response to a determination that the time period defined by the time-period information lapses.

9. A method for creating a webpage, comprising:

using a processor to execute computer-executable instructions stored in a memory to perform operations, comprising:

receiving content, a content address of the content, copyright information on the content, and display-component information corresponding to a display-component for receiving an instruction for posting the content, from an external content storage through a communication module;

storing the copyright information in a memory module so as to correspond the copyright information to the content address;

displaying the display-component corresponding to the display-component information on a display module with the content;

extracting the content address of the content displayed with the display-component and the copyright information corresponding to the content address, from those stored in the memory module, in response to receipt of the instruction for posting the content by the display-component; and describing the content address and copyright information on an edit page for the webpage to be created.

10. The method of claim 9, the operations further comprising:

receiving a comment related to the content;

describing the comment on the edit page; and transmitting described information on the edit page to an external open server computer through the communication module.

11. The method of claim 9, wherein the memory module stores end information indicating that a publishable period of the content is ended, and the operations further comprise:

receiving time-period information, defining a time period during which publicizing of the content is permitted, transmitted from the external content storage through the communication module;

storing the time-period information in the memory module so as to correspond the time-period information to the content address of content associated with the time-period information;

comparing the stored time-period information with a present date and time; and displaying the end information on the display module for the content in relation to the content address corresponding to the time-period information, in response to a determination by the comparing that the time period defined by the time-period information lapses.

12. The method of claim 10, wherein the memory module stores end information indicating that a publishable period of the content is ended, and the operations further comprise:

receiving time-period information, defining a time period during which publicizing of the content is permitted, transmitted from the external content storage through the communication module;

storing the time-period information in the memory module so as to correspond the time-period information to the content address of content associated with the time-period information;

comparing the stored time-period information with a present date and time; and displaying the end information on the display module for the content in relation to the content address corresponding to the time-period information, in response to a determination by the comparing that the time period defined by the time-period information lapses.

13. The method of claim 9, the operations further comprising:

receiving a refusal address of an accessing end to be refused for viewing the content corresponding to the content address described on the edit page; and transmitting the refusal address to an external open server computer through the communication module.

14. The method of claim 10, the operations further comprising:

receiving a refusal address of an accessing end to be refused for viewing the content corresponding to the content address described on the edit page; and transmitting the refusal address to the external open server computer through the communication module.

15. The method of claim 11, the operations further comprising:

receiving a refusal address of an accessing end to be refused for viewing the content corresponding to the content address described on the edit page; and transmitting the refusal address to an external open server computer through the communication module.

16. The method of claim 12, the operations further comprising:
- receiving a refusal address of an accessing end to be refused for viewing the content corresponding to the content address described on the edit page;
- transmitting the refusal address to the external open server computer through the communication module.

17. A non-transitory computer-readable medium having stored thereon computer-executable components that, in response to execution, cause a computing system to perform operations, including:
- receiving content, a content address of the content, display-component information corresponding to a display-component for receiving an instruction for the content posting, and an address of an exterior open server computer linked to the display-component, from an external content storage through a communication module,
- storing the content address in a memory module;
- displaying the display-component corresponding to the display-component information on a display module with the content;
- extracting the content address of the content displayed with the display-component from those stored in the memory module, in response to receipt of an instruction for posting the content by the displayed display-component; and
- transmitting the content address to the external open server computer through the communication module based on the address of the exterior open server computer linked to the display-component.

18. The non-transitory computer-readable medium of claim 17, the operations further including:
- receiving a comment related to the content; and
- transmitting the comment to the external open server computer through the communication module.

* * * * *